United States Patent
Seki

(12) 
(10) Patent No.: US 6,628,046 B2
(45) Date of Patent: Sep. 30, 2003

(54) VIBRATION TYPE ACTUATOR

(75) Inventor: Hiroyuki Seki, Oyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/121,668

(22) Filed: Apr. 15, 2002

(65) Prior Publication Data

US 2002/0109434 A1 Aug. 15, 2002

Related U.S. Application Data

(63) Continuation of application No. 09/084,435, filed on May 27, 1998, now abandoned.

(30) Foreign Application Priority Data

May 27, 1997 (JP) .............................. 9-136510

(51) Int. Cl.$^7$ .............................................. H02N 2/00
(52) U.S. Cl. ................................. 310/323.04; 310/328
(58) Field of Search ........................ 310/328, 323.04, 310/323.01, 323.02, 323.12, 323

(56) References Cited

U.S. PATENT DOCUMENTS

| | | | | |
|---|---|---|---|---|
| 4,642,509 A | * | 2/1987 | Kumada ................. | 310/323.13 |
| 4,672,256 A | | 6/1987 | Okuno et al. ............. | 310/323 |
| 4,692,650 A | | 9/1987 | Okumura et al. .......... | 310/323 |
| 4,692,651 A | | 9/1987 | Hiramatsu et al. ......... | 310/323 |
| 4,692,652 A | | 9/1987 | Seki et al. ............... | 310/323 |
| 4,752,711 A | | 6/1988 | Tsukimoto et al. ......... | 310/323 |
| 4,933,590 A | | 6/1990 | Inoue et al. .............. | 310/323 |
| 5,051,647 A | | 9/1991 | Uchikawa et al. .......... | 310/323 |
| 5,099,167 A | | 3/1992 | Kimura et al. ............ | 310/323 |
| 5,115,161 A | * | 5/1992 | Myohga et al. ........... | 310/323.15 |
| 5,128,580 A | | 7/1992 | Maeno et al. ............. | 310/323 |
| 5,140,214 A | | 8/1992 | Kimura et al. ............ | 310/323 |
| 5,155,407 A | | 10/1992 | Kimura et al. ............ | 310/366 |
| 5,180,941 A | | 1/1993 | Seki et al. ............... | 310/323 |
| 5,187,406 A | | 2/1993 | Seki ...................... | 310/323 |
| 5,192,890 A | | 3/1993 | Kimura et al. ............ | 310/323 |
| 5,231,325 A | * | 7/1993 | Tamai et al. ............. | 310/323.12 |
| 5,241,234 A | | 8/1993 | Seki et al. ............... | 310/323 |
| 5,274,294 A | | 12/1993 | Kimura et al. ............ | 310/323 |
| 5,352,949 A | | 10/1994 | Eguchi et al. ............ | 310/323 |
| 5,387,835 A | | 2/1995 | Tsukimoto et al. ......... | 310/323 |
| 5,484,216 A | | 1/1996 | Kimura et al. ............ | 400/319 |
| 5,596,242 A | | 1/1997 | Seki et al. ............... | 310/328 |
| 5,633,553 A | | 5/1997 | Suzuki ................... | 310/323 |
| 5,646,469 A | | 7/1997 | Tsukimoto et al. ......... | 310/323 |
| 5,698,929 A | | 12/1997 | Seki et al. ............... | 310/323 |
| 5,739,623 A | * | 4/1998 | Kanazawa et al. ......... | 310/323.12 |
| 5,770,916 A | | 6/1998 | Ezaki et al. .............. | 310/366 |
| 5,814,919 A | | 9/1998 | Okumura ................ | 310/323 |

FOREIGN PATENT DOCUMENTS

JP    2002-78363    *  3/2002    ........... H02N/2/00

* cited by examiner

*Primary Examiner*—Thomas M. Dougherty
*Assistant Examiner*—Karen Addison
(74) *Attorney, Agent, or Firm*—Fitzpatrick, Cella, Harper & Scinto

(57) ABSTRACT

A vibration type actuator includes a vibration element having at least a first elastic element, a second elastic element, an electro-mechanical energy conversion element, and a shaft, and a relative moving member which relatively moves upon a vibration of the vibration element. The shaft has a flange portion and a fixing portion joined to a fixing member and clamps the first and second elastic elements by the flange and the nut while the conversion element is clamped between the first and second elastic elements.

2 Claims, 6 Drawing Sheets

VIBRATION TYPE ACTUATOR

This is a continuation application of application Ser. No. 09/084,435 filed May 27, 1998 now abandoned.

BACKGROUND OF THE INVENTION

1. Field of the Invention

The present invention relates to a vibration type actuator using a vibration wave for driving.

2. Related Background Art

Vibration wave actuators are currently used in a variety of application fields. In such a vibration wave actuator, a distortion generation element serving as an electro-mechanical energy conversion element for generating a mechanical distortion in response to an electric or magnetic field is mounted on an elastic element to constitute a vibration element. The vibration of the elastic element is converted into a continuous or intermittent mechanical motion, thereby outputting this motion. Among the vibration wave actuators described above, a piezoelectric/electrostrictive actuator using piezoelectic and electrostrictive elements as distortion generation elements is most popular.

Among the piezoelectric actuators each using the piezoelectric element, an actuator called a vibration wave motor (ultrasonic wave motor) can constitute a continuous rotation driving source. For this reason, this actuator is mounted as a driving source in an optical device such as a camera in place of a conventional rotary electromagnetic driving motor.

Various types of vibration wave motors are available. Commercially available vibration wave motors can be mainly classified into the following types:

1) a flat type in which a traveling vibration wave is excited by a flat or ring-like elastic element, and a disk- or ring-like rotor is brought into press contact with the elastic element; and 2) a rod type (so-called pencil type) in which a rotor is brought into press contact with a Langevin type vibration element.

A conventional ring-like vibration wave motor in FIG. 9 is exemplified as such a vibration wave motor. A rotor 21 rotating together with an output shaft 22 is pressed by a coned disc spring 23 against an elastic element 20 constituting a ring-like vibration element together with a piezoelectric element 25.

This typical vibration wave motor has a high cost as one of the important problems. In the traveling wave type vibration wave motor, the high cost is caused by the following reasons.

1) The shape precision of the annular elastic element must be strictly managed (several $\mu$m to several ten $\mu$m) to match the resonance frequencies of two different vibration modes (or to set these frequencies to come close to each other). For this reason, the elastic element must be machined, and mass production techniques such as forging, powder sintering, or pressing cannot be used.

2) The piezoelectric element is expensive (in particular, a large-diameter vibration element has a large amount of waste material, and post-processing operations such as electrode formation and polarization are required).

3) The piezoelectric element adhesion process is required (since the motor performance greatly depends on adhesion precision, greatest care must be taken for cleaning an adhesion surface, obtaining high surface precision, and determining good adhesion conditions).

A rod-like vibration motor less expensive than the above motor is proposed in place of it, as shown in FIG. 8.

In the vibration wave motor in FIG. 8, a plurality of piezoelectric elements (PZTs) 3 and feed electrode plates are sandwiched between first and second elastic elements respectively having central portions with holes coaxial with the outer diameter. The male thread portion of a shaft 5 extending through these holes threadably engages with an internal thread portion 1e of the first elastic element 1. The elastic elements 1 and 2 which interpose the PZTs 3 and the like between them are fastened by the head of the shaft 5, thereby forming a Langevin type vibration element.

A rotor 8 engaging with a gear 11 and contacting a spring case 9 in the thrust direction, the case 9 incorporating a compression spring 14, the gear 11 rotatably supported by a ball bearing 10, and a motor mounting flange 12 fitted in the ball bearing 10 are disposed around the shaft 5. The motor mounting flange 12 is fixed by a nut member 13. The rotor 8 receives the spring force of the compression spring 14 through the spring case 9 and is pressed against the driving surface of the elastic element 1. The rotation force is transmitted to the gear 11 and output outside the motor.

When an alternating signal serving as a driving signal, e.g., a periodic voltage is applied to the PZTs 3, a driving wave as the synthesis of flexural vibrations is generated on the driving surface of the first elastic element 1. This driving wave frictionally drives the rotor 8.

The rod-like vibration wave motor shown in FIG. 8 can be made compact (the piezoelectric elements can be stacked to allow to obtain a compact motor, and the input power can be supplied to this compact motor). The motor is of a Langevin type in which the piezoelectric elements need not be adhered. This allows low cost structurally. In practice, the vibration wave motor in FIG. 8 is less expensive than the vibration wave motor shown in FIG. 9.

The above motor is still more expensive several times than a compact electromagnetic motor, assuming that equal outputs are obtained from these motors. The vibration wave motors have been used in only the technical fields sufficiently utilizing their characteristic features (e.g., quietness, direct driving, and holding power).

The cost reduction is an indispensable factor for using the vibration wave motors in a variety of fields to the same degree as the electromagnetic motors. This is the most important problem.

SUMMARY OF THE INVENTION

One aspect of the invention is to provide a vibration type actuator having a vibration element in which an electro-mechanical energy conversion element is sandwiched between first and second elastic elements using a shaft extending through central portions, the shaft clamping the first and second elastic elements from two sides by a flange portion and a nut.

The above and other objects, features, and advantages of the present invention will be apparent from the following detailed description taken in conjunction with the accompanying drawings.

BRIEF DESCRIPTION OF THE DRAWINGS

FIGS. 5A, 5B and 5C show the fourth embodiment of the present invention, in which FIG. 5A is a side view of a shaft, FIG. 5B is an enlarged view of a shaft flange portion, and FIG. 5C is an enlarged view of a modification of the flange portion;

FIGS. 7A and 7B show the first elastic element, in which FIG. 7A is a plan view thereof, and FIG. 7B is a sectional view of the first elastic element taken along the line 7B—7B in FIG. 7A;

DETAILED DESCRIPTION OF THE PREFERRED EMBODIMENTS (First Embodiment)

Figure 1:
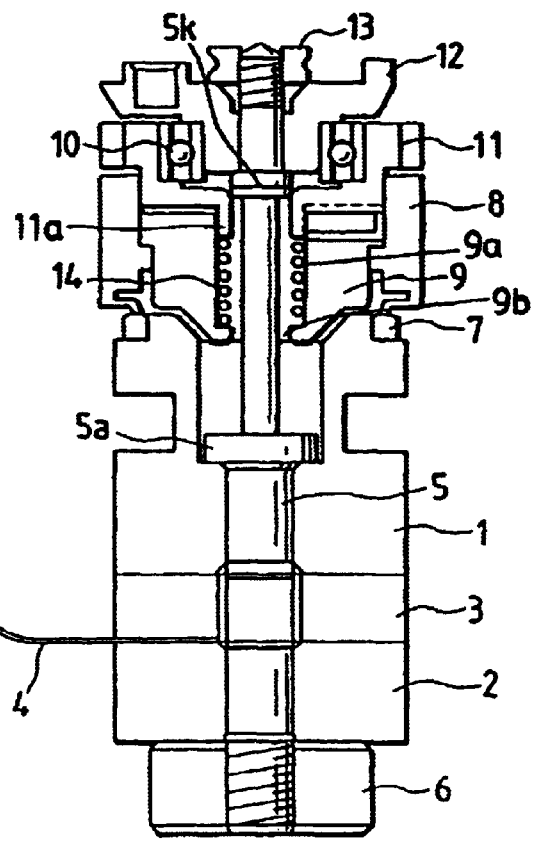
FIG. 1 is a sectional view of a vibration wave motor according to the first embodiment of the present invention.

FIG. 1 shows the first embodiment of the present invention.

A stacked piezoelectric element (to be referred to as a stacked PZT hereinafter) 3 and feed flexible printed board 4 are sandwiched between first and second elastic elements 1 and 2 having central portions with holes coaxial with the outer diameter. The first and second elastic elements 1 and 2, the stacked PZT 3, and the feed flexible printed board 4 are fastened by a nut 6 and a flange portion 5a of the shaft 5 extending through the above holes, thereby forming a Langevin type vibration element. A friction ring (SUS420J2 hardened body) is bonded to the driving portion of the upper portion (FIG. 1) of the first elastic element 1 with an adhesive.

An aluminum rotor 8 is anodized and bonded to an iron-based metal spring case 9 with an adhesive or the like. The spring case 9 has a cylinder portion for guiding the spring and a flange portion formed below the cylinder portion to receive the spring. The flange portion and the lower portion of a gear 11 clamp a compression spring 14 to press the rotor 8 against the friction ring 7 of the vibration element 1 with respect to the gear 11.

The gear 11 is positioned in the thrust direction through a ball bearing 10 by a motor mounting flange 12 positioned by a positioning step portion 5k formed on the shaft 5 and a nut 13 for fixing the motor mounting flange 12. The gear 11 is rotatably supported by the ball bearing 10.

The vibration wave motor having the arrangement described above is driven as follows. When two-phase alternating signals having a phase shift are applied to the stacked PZT 3, bending vibrations are excited in the vibration element 1 in two directions with respect to the longitudinal direction of the shaft 5. These bending vibrations are synthesized to obtain a synthetic vibration which allows the vibration element 1 to perform a rope-skipping motion. An elliptical vibration occurs on the sliding surface of the friction ring. This allows integral rotation of the rotor 8, the spring case 9, and the gear 11. Two radial grooves (not shown) are formed in the spring case 9. Two projections (not shown) on the gear 11 are fitted in the grooves without any backlash. The rotation force of the rotor 8 can be transmitted to the gear 11 without any loss.

In this embodiment, the SK4F material (free-cutting material) is cut to form the shaft. Since the maximum diameter of the shaft is smaller than that of the conventional example (the diameter of the flange portion 5a decreases from 7.6 mm (conventional case) to 3.8 mm), and the cutting amount is small, the cutting cost can be reduced to about ⅔ that of the conventional case. The vibration element 1 need not have the internal thread portion, and the number of machining steps can be greatly reduced, thereby reducing the machining cost to about ½. The elimination of the thread portion allows die casting using zinc or aluminum, thereby reducing the cost to ½ to ⅓ the cutting operation.

The flange portion 5a of the shaft 5 is located near the central portion of the shaft in this embodiment, and the nut is threadably engaged with the end portion of the shaft. However, a flange may be formed at the end portion of the shaft, and the central portion (5a in FIG. 1) may be fastened by a nut.

(Second Embodiment)

Figure 2:
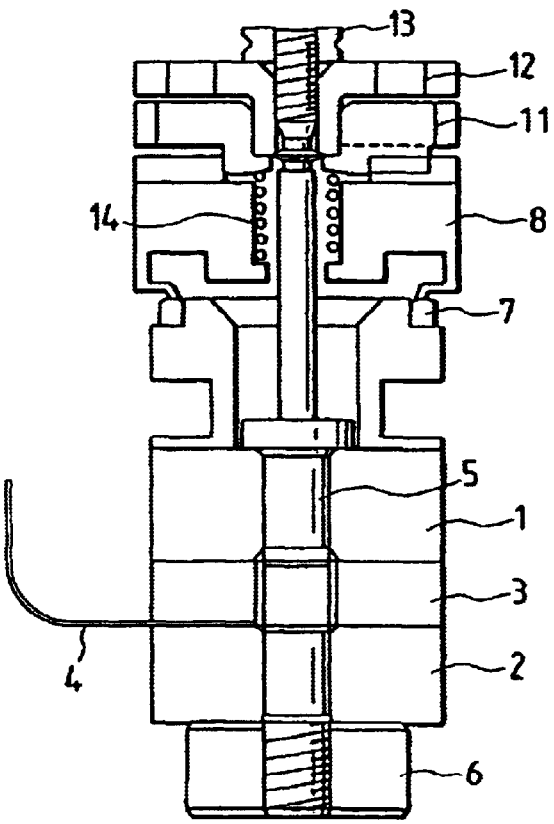
FIG. 2 is a sectional view of a vibration wave motor according to the second embodiment of the present invention
Figure 3:
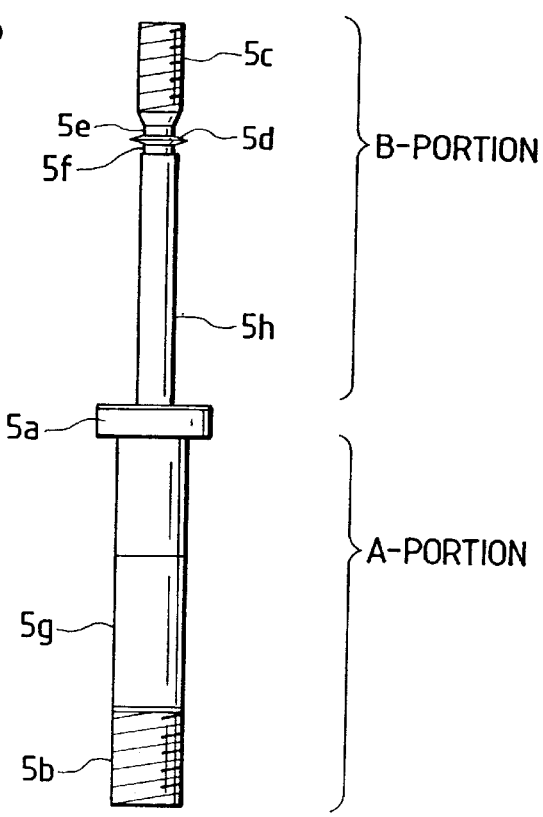
FIG. 3 is a side view of a shaft shown in FIG. 2.

FIGS. 2 and 3 show the second embodiment.

FIG. 2 is a sectional view of a rod-like vibration wave motor, and FIG. 3 is a plan view of a shaft in FIG. 2.

In this embodiment, a shaft 5 is formed by header working, and a thread portion 5b at the distal end of a large-diameter shaft portion (A-portion), a thread portion 5c at the distal end of a small-diameter shaft portion (B-portion) located opposite to the A-portion through a flange 5a formed near the center of the shaft 5, and a positioning portion 5d for the motor mounting flange 12 are formed by rolling.

Figure 10:
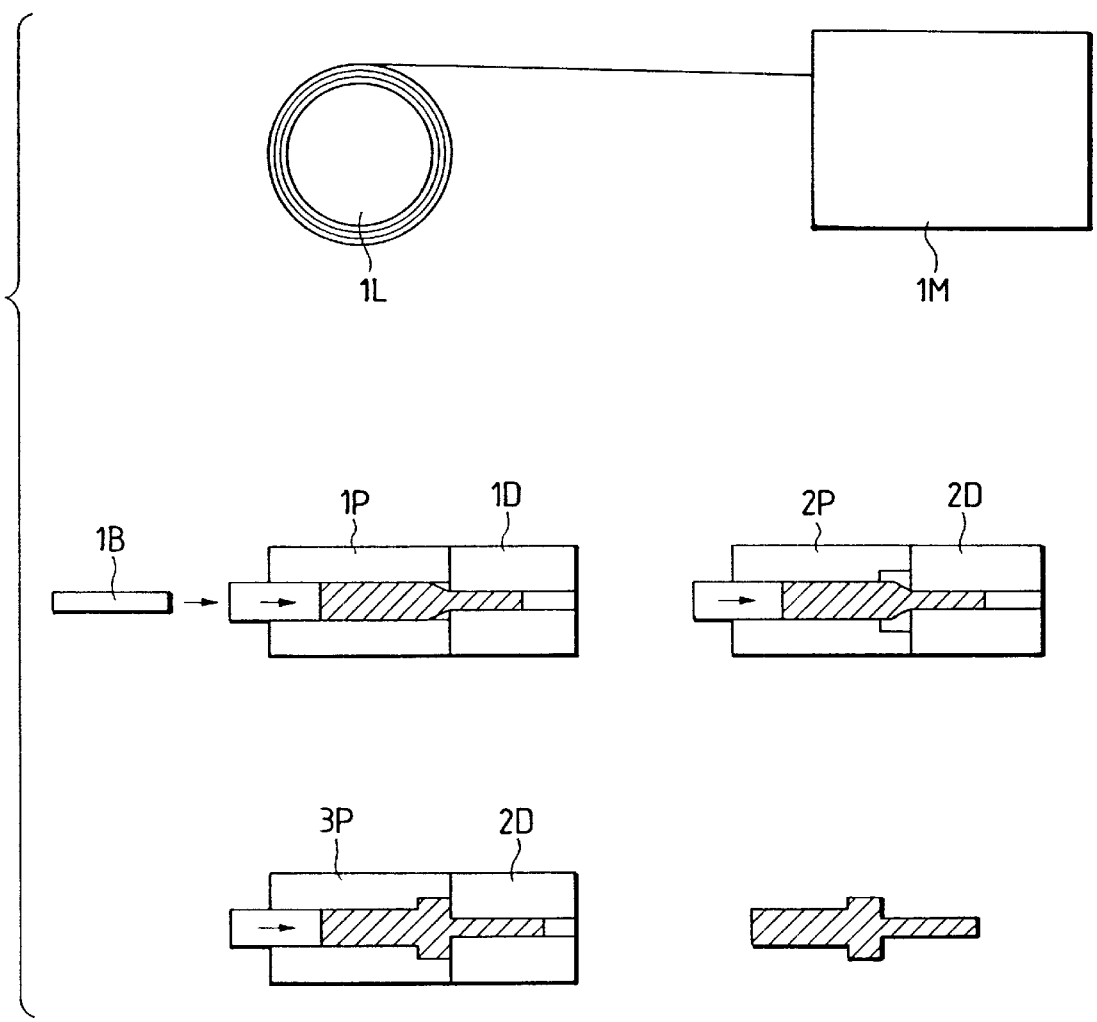
FIG. 10 is a view showing the working process of a header of the second embodiment.

Header working is a kind of plastic working using a forging die or the like and used to form bolts and shafts. In this embodiment, as shown in FIG. 10, a long wire 1L wound in a coil serving as a shaft material is cut by a header working machine 1M in an appropriate length, and the cut piece serves as a blank 1B.

Punches (e.g., 1P, 2P, and 3P) and dice (e.g., 1D and 2D) are prepared in the header working machine 1M. In the firs step (combination of the punch 1P and the die 1D), coarse working is performed such that the blank 1B is compressed (extruded) from a coarse forming punch 1P side to form a thin pin having a step. In the second step, the body formed in the first step and indicated by the hatched portion is further formed using the second punch P2 and the second die D2. These steps were sequentially repeated to obtain a finished product.

In this embodiment, the shaft material was SCM435, hardening was performed to have a hardness of HRC 40 or more after rolling, and NiP plating was performed to prevent rust.

The shaft mainly has four roles as in the first embodiment.

First, the A-portion fastens elastic elements 1 and 2, a PZT 3, and a flexible printed board 4 with a strong clamping force by using a nut 6 to form a rod-like vibration element. To obtain a highly efficient vibration element, the clamping force becomes an important parameter. Therefore, the strength of the A-portion must be kept high.

In this embodiment, since the outer diameter of the vibration element was 10 mm, the A-portion had to be tightened with an axial force of 200 kgf or more in order to increase the Q value of the vibration element. For this purpose, the diameter of the A-portion was set to 2.3 mm, and the material was hardened to obtain a hardness of HRC 40 or more in order to increase the axial strength. To increase the tensile force and the twist breaking strength of the shaft upon tightening the nut, the thread portion 5b was set to have a diameter of 2.3 mm and was formed into fine screw thread in order to increase the diameter of the valley of the portion 5b which had the smallest diameter.

Second, the B-portion serves as the motor support portion which prevents the vibration of the A-portion from being transmitted to the motor flange 12. For this purpose, the B-portion was set to have a diameter smaller than that of the A-portion, and the length of the B-portion was also set to an appropriate value to optimize bending rigidity, thereby preventing the B-portion from interfering with the vibration of the A-portion. In FIG. 3, the diameter of a portion 5h was set to 1.4 mm; and the length of the B-portion, 13.2 mm.

Third, the shaft has a function of positioning the motor flange to set the compression amount of the compression spring, thereby setting the compression force. For this purpose, the shaft has the positioning abutment portion 5d. Since the motor mounting flange 12 is inserted from the portion 5c side, the outer diameter of the portion 5d must be larger than the maximum diameter of the portion 5c. To increase the diameter of the portion 5d by rolling, portions 5e and 5f are made thin, and the excess portion is added to the portion 5d. To efficiently increase the diameter of the portion 5d, the portion 5d has a barrel shape.

Fourth, the thread portion 5c must engage with the motor mounting flange 12 without any backlash to improve rotation precision between the flange and the shaft 5. The flange 12 is an important part to engage with a gear 11 and a rotor 8, thereby maintaining the coaxial precision of these parts.

(Third Embodiment)

Figure 4:
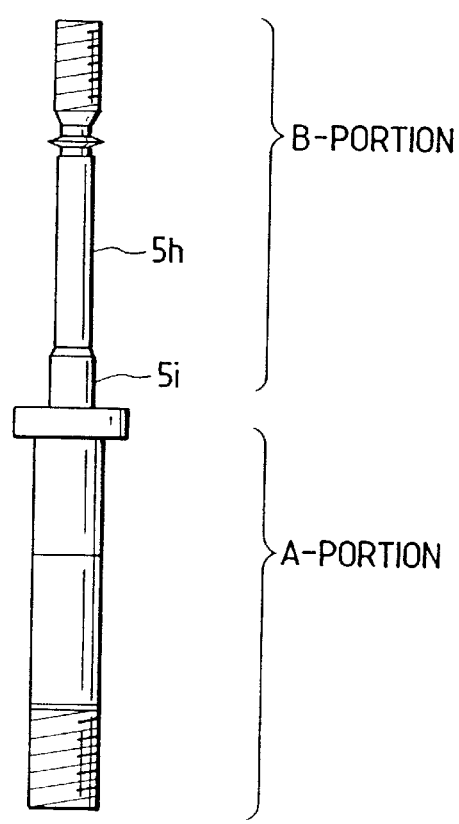
FIG. 4 is a side view of a shaft according to the third embodiment of the present invention.

FIG. 4 shows the third embodiment.

In this embodiment, a B-portion has two diameter portions 5h and 5i to form a step. The diameters and lengths of these portions are adjusted to allow the B-portion to have an optimal support function.

The length of the B-portion is limited by the motor size and serves as a parameter which cannot be greatly changed. The following design for the B-portion is made.

In this embodiment, the portion 5i had a diameter of 1.4 mm and a length of 1.8 mm. The portion 5h had a diameter of 1.2 mm. The boundary between these two portions had a 15° taper so as to easily obtain the diameter difference between them. The overall length was 13.2 mm as in the second embodiment shown in FIG. 3.

A further advantage in forming the step in the shaft is to allow two-step drawing in header working, so that the portion 5h can be further made thin. When a hard material with a high carbon content like SCM435 is used as in this embodiment, the shaft shape of the second embodiment shown in FIG. 3 has a limitation on area reducing ratio. For this reason, the portion 5h has a diameter limitation as small as 1.5 to 1.6 mm. In the embodiment shown in FIG. 4, a diameter of 1.2 mm can be achieved, thereby increasing the degree of freedom in designing the B-portion.

The B-portion has a step in this embodiment. However, the number of steps is not limited to a specific value as far as the support function of the B-portion is optimized.

(Fourth Embodiment)

Figure 5A:
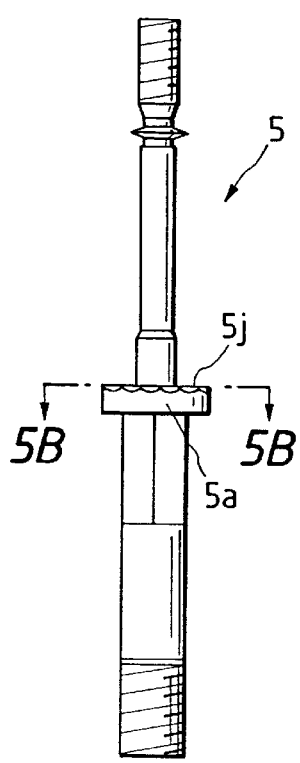
Figure 5B:
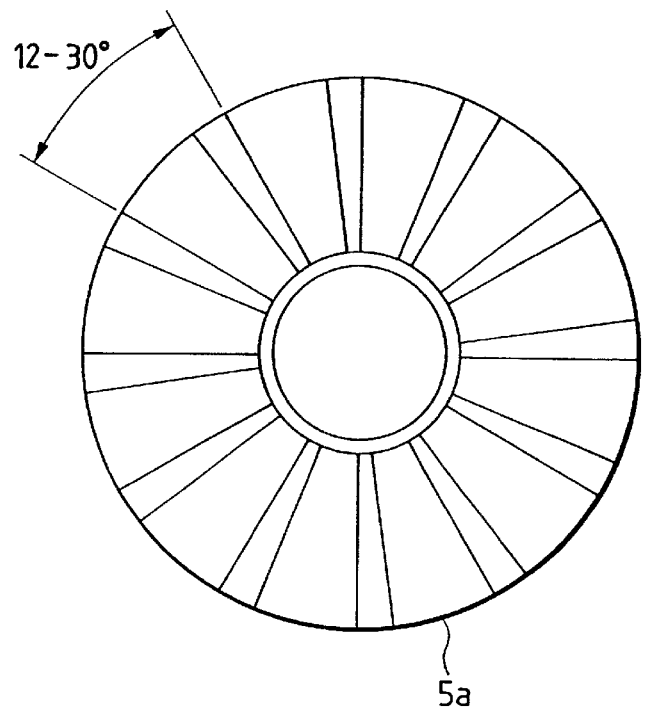
Figure 5C:
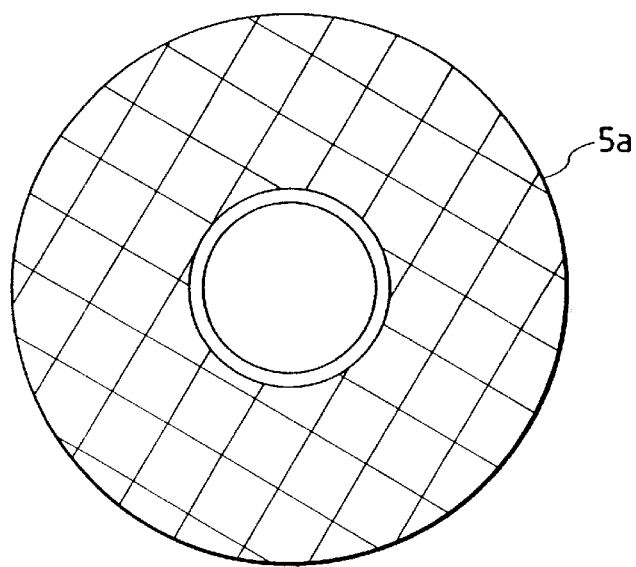

FIGS. 5A to 5C show the fourth embodiment.

A serration 5j having a groove depth of about 0.2 mm and 12 teeth is formed on a flange 5a of the central portion of the shaft on the B-portion side in this embodiment. The serration 5j is meshed with a jig in assembling a vibration element, thereby facilitating the assembly. A method of assembling the vibration element will be described below.

Figure 7A:
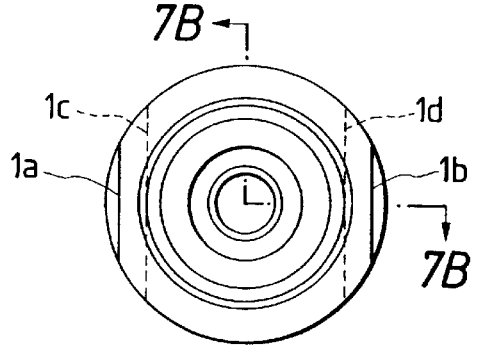
Figure 7B:
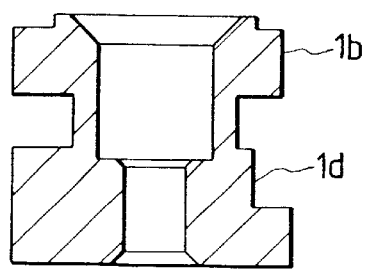

As previously described, the vibration element has a structure in which a stacked PZT 3 and a flexible printed board 4 are sandwiched between elastic elements 1 and 2, and these members are fastened by a nut 6 and the flange 5a of the shaft. In this case, the elastic element 1 has two opposing chamfered portions 1a and 1b and two opposing chamfered portions 1c and 1d, as shown in FIGS. 7A and 7B. These chamfered portions must be positioned in a direction perpendicular to the vibration direction of the first vibration mode. The relative positional relationship between the stacked PZT 3 and the flexible printed board 4 is determined by the electrode relationship, as a matter of course.

Figure 8:
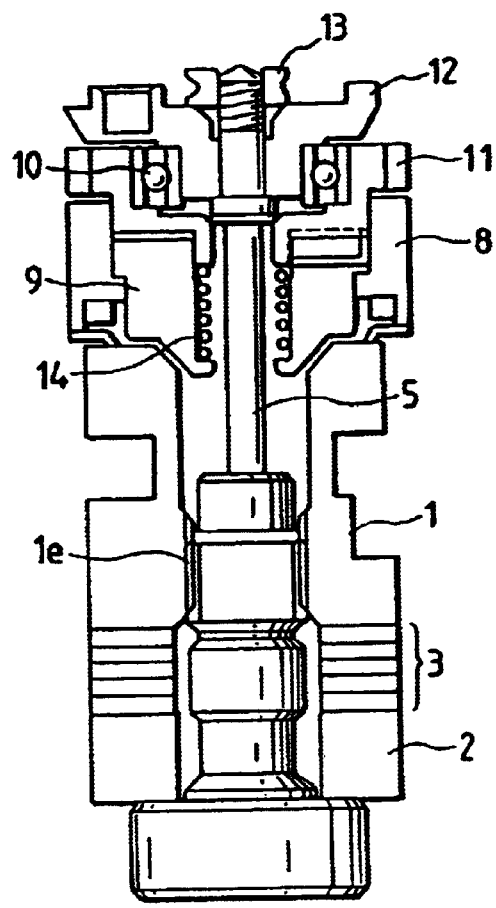
FIG. 8 is a sectional view of a conventional vibration wave motor.
Figure 9:
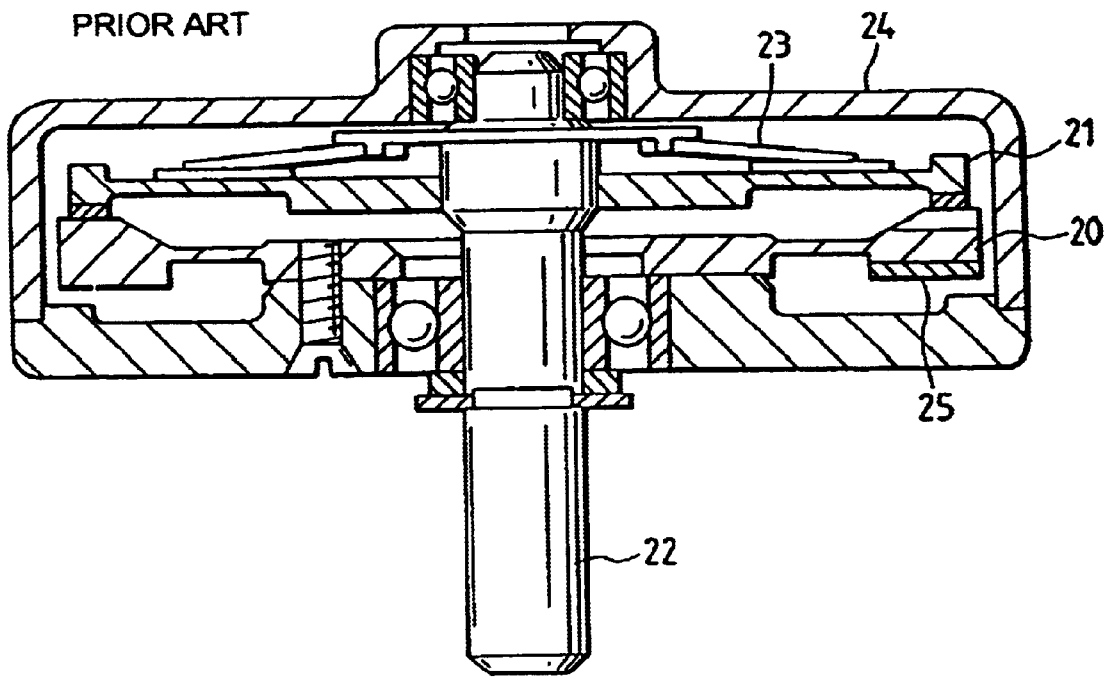
FIG. 9 is a sectional view of a conventional ring type vibration wave motor.

More specifically, the relative positional relationship between the elastic element 1, the stacked PZT 3, and the flexible printed board 4 is predetermined. When the positions of the elastic element 1, the stacked PZT 3, and the flexible printed board 4 are relatively shifted from each other in assembly, the performance of the vibration element is greatly impaired. The conventional vibration element (FIG. 8) is assembled as follows. Since the thread portion is formed on the elastic element 1, a jig fitted on the PZT 3 and the elastic element 2 clamps the outer surface of the elastic element 1 to control the coaxial precision between them in assembly. The shaft 5 is inserted from the elastic element 2 side while slightly holding the end face of the elastic element 2 toward the elastic element 1 side. The shaft 5 is threadably engaged in the elastic element 1 and fastened with a necessary torque. The end face of the elastic element 2 is slightly held to prevent the elastic element 2 from rotating together with the shaft with the frictional force at the contact surface of the shaft and from shifting the PZT and the like together with the shaft.

Figure 6:
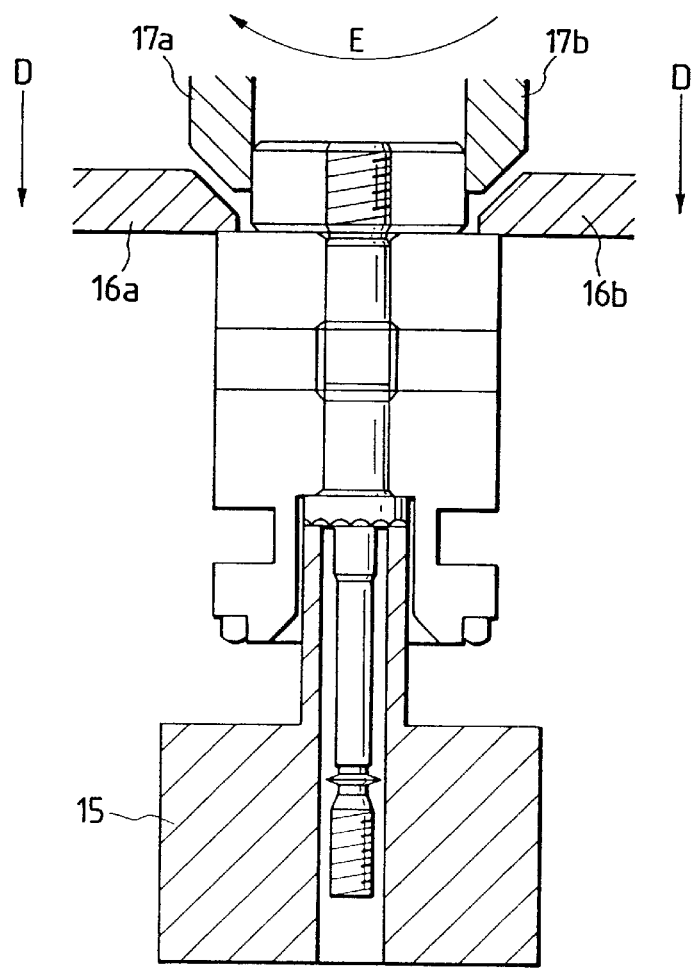
FIG. 6 is a sectional view showing the assembled state of a vibration element.

In the fourth embodiment, however, since the shaft is fitted with the elastic element 1 with play, the vibration element cannot be assembled while holding the elastic element 1. The shaft is set upside down, as shown in FIG. 6, and the serration portion 5j of the shaft flange is engaged with the jig (the jig also has a serration which can be fitted with the serration of the shaft). The elastic element 1, the PZT 3, the flexible printed board 4, and the elastic element 2 are fitted on the shaft 5, as shown in FIG. 6. The nut 6 is fastened while applying a preliminary pressure from jigs 16a and 16b in the D direction. Therefore, assembly can be improved while preventing rotation of the shaft in tightening the nut.

The serration 5j has an inclination in a direction to receive a catching force in tightening the nut 6. Although not shown, a jig for adjusting the coaxial relationship between the elastic elements 1 and 2, the PZT 3, and the flexible printed board 4 is used during the assembly, as a matter of course.

The serration 5j may be obtained by cross-hatched knurling, as shown in FIG. 5C. In this case, the shaft contact surface of an assembling jig 15 must also be similarly knurled. A roughened surface (not shown) having a surface roughness of 5 to 20 S may be used in place of the serration 5j to obtain the same effect as described above.

In the above embodiments, the shaft materials are SK4F and SCM435. However, the shaft material is not limited to these materials, but can be another metal material or a polymer material such as a reinforced plastic. If header working and rolling are required, a material having ductility and toughness is preferable. Examples of such a material are chromium molybdenum steel (e.g., SCM415 or SCM445), nickel molybdenum steel, brass (73 series), stainless steel (SUS304), carbon steel (e.g., S45C), titanium, and heat-resistant steel (e.g., Inconel), which are excellent in workability. In particular, if a high shaft strength is required, a material which can be hardened is preferable.

As has been described above, the embodiments have the following effects.

1) Since the thread portion of the elastic material can be eliminated, the number of steps of the vibration element can be greatly reduced, thereby greatly reducing the cost of the vibration type actuator.

2) The three-dimensional pattern which resists rotation is formed on the flange portion of the shaft or the nut member, a sufficient fastening torque can be applied even with the small diameter of the shaft flange. The difference between the maximum and minimum diameters of the shaft member can be reduced. The number of working steps can be reduced to reduce the cost of the shaft member.

3) The shaft member can be formed by header working or rolling. The cost of the shaft member can be further reduced.

4) The portions having different diameters are formed in the small-diameter shaft portion of the shaft member. Therefore, optimal support shape design can be facilitated without imposing a limitation on the length of the shaft member.

What is claimed is:

1. A vibration type actuator comprising:

a vibration element including a first elastic member, a second elastic member, and an electro-mechanical energy conversion element disposed between the first elastic member and the second elastic member;

a vibration element mounting member; and a shaft engageable with the vibration element mounting member and having a main shaft portion extending from the vibration element mounting member to the vibration element and a terminal portion extending through at least the electro-mechanical energy conversion element and the first elastic member so as to support said vibration element, the shaft further having an enlarged diameter positioning portion engageable with the vibration element mounting member and thin diameter portions sandwiching the enlarged diameter positioning portion, each of said thin diameter portions having a diameter smaller than the diameter of the main shaft portion.

2. A vibration type actuator according to claim 1, wherein said positioning portion is barrel-shaped.

* * * * *

UNITED STATES PATENT AND TRADEMARK OFFICE
CERTIFICATE OF CORRECTION

PATENT NO.         : 6,628,046 B2
APPLICATION NO. : 10/121668
DATED                 : September 30, 2003
INVENTOR(S)      : Hiroyuki Seki It is certified that error appears in the above-identified patent and that said Letters Patent is hereby corrected as shown below:

COLUMN 2:
Line 67, "tion" should read --tion;--.

COLUMN 4:
Line 39, "firs" should read --first--.

Signed and Sealed this

Eighth Day of January, 2008

JON W. DUDAS
*Director of the United States Patent and Trademark Office*